(12) United States Patent
Arakeri et al.

(10) Patent No.: US 12,515,147 B2
(45) Date of Patent: Jan. 6, 2026

(54) REPLACEABLE SPIN-ON FILTER WITH DIE CASTED UNITARY ENDPLATE

(71) Applicant: Cummins Filtration IP, Inc, Columbus, IN (US)

(72) Inventors: Sudhindra Palaxa Arakeri, Shahapur (IN); Pravin Shantinath Kadam, Kolhapur (IN); Hiren M. Gardhariya, Pune (IN); Kevin C. South, Cookeville, TN (US); Ismail C. Bagci, Cookeville, TN (US); Mark T. Schoolfield, Pleasant Shade, TN (US); Santoshini Choudhary, Bengaluru (IN); Charles W. Hawkins, Sparta, TN (US)

(73) Assignee: Atmus Filtration IP Inc., Nashville, TN (US)

( * ) Notice: Subject to any disclaimer, the term of this patent is extended or adjusted under 35 U.S.C. 154(b) by 790 days.

(21) Appl. No.: 17/619,066

(22) PCT Filed: Jun. 23, 2020

(86) PCT No.: PCT/US2020/039148
§ 371 (c)(1),
(2) Date: Dec. 14, 2021

(87) PCT Pub. No.: WO2020/263835
PCT Pub. Date: Dec. 30, 2020

(65) Prior Publication Data
US 2022/0297033 A1    Sep. 22, 2022

(30) Foreign Application Priority Data

Jun. 28, 2019 (IN) .............................. 201941025839

(51) Int. Cl.
*B01D 27/08* (2006.01)
*B01D 27/06* (2006.01)

(52) U.S. Cl.
CPC ............. *B01D 27/08* (2013.01); *B01D 27/06* (2013.01); *B01D 2201/302* (2013.01); *B01D 2201/304* (2013.01)

(58) Field of Classification Search
CPC .. B01D 27/08; B01D 27/06; B01D 2201/302; B01D 2201/304; B01D 2201/295
See application file for complete search history.

(56) References Cited

U.S. PATENT DOCUMENTS

2007/0095744 A1   5/2007  Bagci et al.
2009/0127170 A1 * 5/2009  Kolczyk .............. B01D 35/147
                                                    210/130

(Continued)

FOREIGN PATENT DOCUMENTS

EP           718021 A2 *  6/1996  ............. B01D 27/06

OTHER PUBLICATIONS

International Search Report and Written Opinion issued for PCT Application No. PCT/US2020/039148 issued Nov. 24, 2020, 11 pages.

*Primary Examiner* — Waqaas Ali
(74) *Attorney, Agent, or Firm* — Foley & Lardner LLP

(57) ABSTRACT

A spin-on filter cartridge assembly includes a shell, a filter element, and an end plate. The shell defines an interior cavity. The filter element is disposed within the interior cavity and includes filter media. The end plate is coupled to the shell and is sealingly engaged with the filter media. The end plate retains the filter element within the interior cavity. In some embodiments, the end plate is integrally formed as a single unitary body.

17 Claims, 8 Drawing Sheets

(56) References Cited

U.S. PATENT DOCUMENTS

| | | | |
|---|---|---|---|
| 2009/0166287 A1* | 7/2009 | Korst | B01D 29/111 |
| | | | 264/138 |
| 2011/0302890 A1* | 12/2011 | Heikamp | B01D 46/003 |
| | | | 55/436 |
| 2014/0170747 A1* | 6/2014 | Ellis | C12M 23/38 |
| | | | 435/252.31 |
| 2019/0143251 A1 | 5/2019 | Malgorn et al. | |

* cited by examiner

REPLACEABLE SPIN-ON FILTER WITH DIE CASTED UNITARY ENDPLATE

CROSS-REFERENCE TO RELATED PATENT APPLICATIONS

The present application is a National Phase Application based on PCT Application No. PCT/US2020/039148, filed Jun. 23, 2020, which claims the benefit of and priority to Indian Provisional Patent Application No. 201941025839, entitled "Replaceable Spin-on Filter with Die Casted Unitary Endplate" and filed Jun. 28, 2019. The contents of these applications are incorporated herein by reference in their entirety and for all purposes.

TECHNICAL FIELD

The present application relates generally to filter elements for filtering fluids in internal combustion engine systems.

BACKGROUND

In various applications, it is generally desirable to minimize the amount of particulate contamination in liquids used to power and lubricate an internal combustion engine. The amount of particulate contamination can be reduced by passing the liquids through a filter element or cartridge, which captures solid particles entrained within the fluid.

SUMMARY

One embodiment of the present disclosure relates to a spin-on filter cartridge assembly. The spin-on filter cartridge assembly includes a shell, a filter element, and an end plate. The shell defines an interior cavity. The filter element is disposed within the interior cavity and includes filter media. The end plate is coupled to the shell and is sealingly engaged with the filter media. The end plate retains the filter element within the interior cavity.

Another embodiment of the present disclosure relates to a filter element of a spin-on filter cartridge assembly. The filter element includes filter media and an end plate. The filter media includes filter media that is configured to filter a fluid passing therethrough. The filter media includes a first side and a second side. The end plate is sealingly engaged with the filter media. The end plate includes an inner fluid passageway and an outer fluid passageway. The inner fluid passageway is fluidly coupled to the first side. The outer fluid passageway is spaced radially apart from the inner fluid passageway and is fluidly coupled to the second side.

Yet another embodiment of the present disclosure relates to a filtration system. The filtration system includes a filter head and a filter cartridge. The filter cartridge includes a shell, a filter element, and an end plate. The shell defines an interior cavity. The filter element is disposed within the interior cavity and includes filter media. The end plate is coupled to the shell and is sealingly engaged with the filter media. The end plate is engaged with and coupled to the filter head.

BRIEF DESCRIPTION OF THE FIGURES

The details of one or more implementations are set forth in the accompanying drawings and the description below. Other features, aspects, and advantages of the disclosure will become apparent from the description, the drawings, and the claims, in which:

Figure 1:
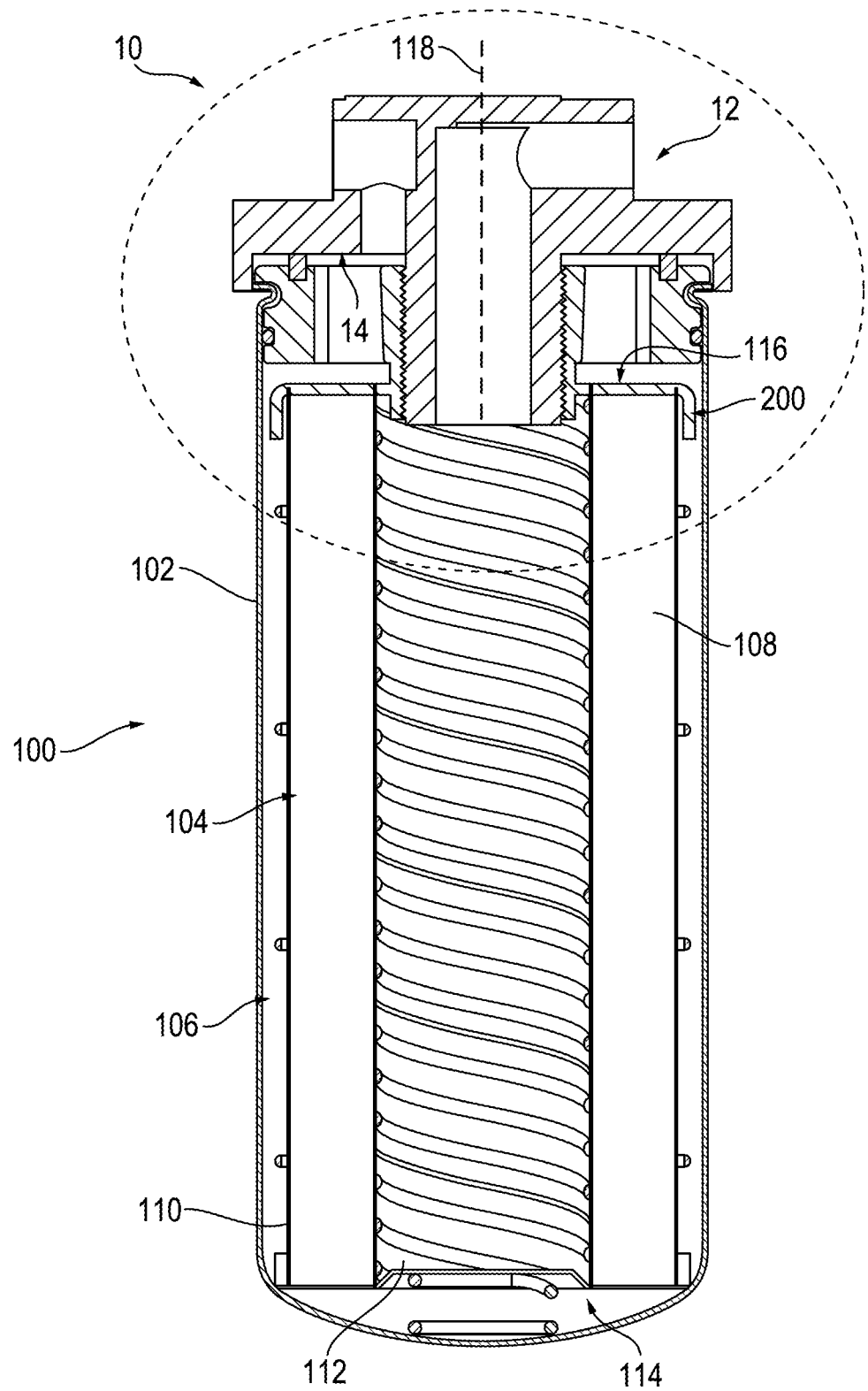
FIG. 1 is a side cross-sectional view of a first spin-on filter cartridge assembly and filter head.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, a spin-on filter cartridge assembly for a liquid filtration system. The various concepts introduced above and discussed in greater detail below may be implemented in any of numerous ways, as the described concepts are not limited to any particular manner of implementation. Examples of specific implementations and applications are provided primarily for illustrative purposes.

I. Overview

Internal combustion engine systems require a clean source of fluids (e.g., fuel, oil, etc.) to power and lubricate the engine. Unfiltered fluids may include dirt, metal particles, and other solid contaminants that can damage engine components (e.g., fuel injectors, cylinder rings, pistons, etc.). In order to protect the engine components, the internal combustion engine systems may include a filtration system, which filters incoming and/or recirculating fluids to remove any solid materials before passing the fluids to the engine. In some instances, the filtration system includes a replaceable spin-on filter cartridge, which may be periodically replaced by an operator and/or technician to maintain the differential pressure across the filtration system to within reasonable levels.

A spin-on filter cartridge may include various components to facilitate engagement and coupling of the spin-on filter cartridge to a filter head and to prevent fluid bypass between the clean and dirty sides of the spin-on filter cartridge. For example, the spin-on cartridge may include an end plate assembly that includes an end cap, a nut plate, a retainer ring, a gasket, and/or other components. The end plate assembly may be coupled to a housing (e.g., shell) of the spin-on filter cartridge and may retain (e.g., hold, secure, etc.) a filter element within the housing. The end cap may be coupled to an end of the filter element. The nut plate may be sealingly engaged with the endplate via the gasket and may include a threaded portion to threadably couple the cartridge to the filter head. The gasket may sealingly engage the end cap with the nut plate to prevent bypass fluid flow between the clean and dirty sides of the filter cartridge. The retainer ring may be welded or otherwise coupled to the nut plate and may include channels into which a sealing member may be received to sealingly engage the retainer ring to the filter head and to prevent fluid leakage to an environment surrounding the spin-on filter cartridge.

As a result of height variations between different components (e.g., filter element), the filter housing may need to be over sized to ensure that there is enough clearance for the filter element within the filter housing. A spring is generally required within the spin-on filter cartridge to accommodate the height variation and to ensure proper compression and sealing between the end cap of the filter element and the nut plate (e.g., to ensure proper compression of the gasket between the end cap of the filter element and the nut plate). In some cases, the fluid pressure acting on the filter element limits the maximum differential pressure that can be achieved across the filter element without bypassing the filter element. In these cases, the fluid pressure acting upon the filter element overcomes the spring force and separates the gasket from the end cap and/or nut plate.

Referring to the figures generally, a spin-on filter cartridge assembly for a liquid filtration system is shown. The spin-on filter cartridge includes a single piece end plate that couples a filter element to both (i) a shell housing; and (ii) a filter head of the liquid filtration system. Among other benefits, the single piece construction of the end plate eliminates the need for a separate sealing member or gasket between the filter element and an end plate assembly to prevent dirty fluid from bypassing the filter element once the spin-on cartridge is mounted to the filter head (e.g., due to increased pressure drop across the filter element).

The end plate sets a position of the filter element relative to the filter head and includes a plurality of outer fluid passageways that guide dirty fluid from the filter head to a dirty side of the filter element. The end plate also includes an inner fluid passageway that guides clean fluid from a clean side of the filter element back into the filter head. The end plate fluidly isolates the outer fluid passageways from the inner fluid passageway without a separate gasket and/or sealing element, thereby minimizing the risk of fluid bypass between the dirty side and the clean side due to elevated pressures. The single piece end plate also eliminates the need for separate springs that are used to accommodate height variations of the filter element and to maintain compression between the filter element and other parts of the spin-on filter cartridge. This also allows a greater manufacturing tolerance range for the filter element without changing the performance characteristics of the spin-on filter cartridge (e.g., the maximum allowable pressure drop across the spin-on filter cartridge). In other words, because the single piece end plate is directly mechanically connected to the filter element, the end plate design minimizes bypass at higher differential pressures across the filter element and eliminates any performance differences that might result from small variations in filter element height. Moreover, because springs in the spin-on filter cartridge are not required, the single piece end plate also minimizes the overall size of the spin-on filter cartridge (e.g., the shell/housing).

In one embodiment, a spin-on filter cartridge assembly includes a shell, a filter element, and an end plate. The shell defines an interior cavity. The filter element is disposed within the interior cavity. The end plate is formed as a single unitary body and includes an inner body portion, an outer body portion, and an end cap portion. The inner body portion is structured to threadably engage the spin-on filter cartridge assembly to a filter head. The inner body portion defines an inner fluid passageway. The outer body portion is coupled to the inner body portion and is spaced apart from the inner body portion in an at least partially radial direction relative to a central axis of the inner body portion to define an outer fluid passageway. The inner fluid passageway is fluidly isolated from the outer fluid passageway by the inner body portion. The outer body portion is coupled to the shell. The end cap portion is coupled to a distal end of the inner body portion and is sealingly engaged with the filter element.

II. Example Spin-on Filter Cartridge

FIG. 1 is a side cross-sectional view of a liquid filtration system 10. The liquid filtration system 10 may be used to filter a fluid provided to an internal combustion engine. The fluid may be a fuel, an engine oil, a hydraulic oil, or another lubricant. In the example embodiment of FIG. 1, the liquid filtration system 10 is a fuel filtration system for a diesel engine that uses diesel fuel to drive the combustion process. The liquid filtration system 10 is configured to be mounted on the diesel engine but may be mounted remotely from the diesel engine in various example embodiments. As shown in FIG. 1, the liquid filtration system 10 includes a spin-on filter cartridge 100. The filter cartridge 100 is coupled to a filter head 12 of the liquid filtration system 10 (e.g., a fuel filtration system). Specifically, the filter cartridge 100 is threadably coupled to the filter head 12. The filter cartridge 100 includes a cylindrically-shaped shell 102 (e.g., housing) and a filter element 104. In other embodiments, the shape of the shell 102 may be different. The shell 102 includes a cylindrically-shaped side wall having an open end and a closed end. The shell 102 defines a hollow interior 106 that is sized to receive the filter element 104 therein.

As shown in FIG. 1, the filter element 104 includes a cylindrically-shaped media pack 108 including a filter media 110. In other embodiments, the cross-sectional shape of the media pack 108 may be different. The filter media 110 is structured to filter particulate matter from fuel flowing therethrough so as to produce filtered fluid (e.g., clean fluid). The filter media 110 may include a porous material having a predetermined pore size. The filter media 110 may include a paper-based filter media, a fiber-based filter media, or the like. The filter media 110 may be pleated or formed into another desired shape to increase a flow through the media pack 108, or to otherwise alter the particle removal efficiency of the filter element 104. In the example embodiment of FIG. 1, the filter element 104 is arranged as an outside-in flow filter element 104 having an outer dirty side and an inner clean side. In an alternative arrangement, the filter element 104 is an inside-out filter element having an inner dirty side and an outer clean side. Fluid to be filtered passes from the dirty side of the filter element 104 to the clean side of the filter element 104. The filter element 104 includes a lower end cap 112 disposed at a lower end 114 (e.g., bottom end as shown in FIG. 1, a first end, etc.) that is sealingly engaged with the filter element 104 to prevent fuel bypass between the clean and dirty sides.

As shown in FIG. 1, the filter cartridge 100 additionally includes an end plate 200 that is structured to sealingly engage the filter element 104 with the filter head 12. The end plate 200 integrates various functional components of the filter cartridge 100 together into a single unitary body. For example, the end plate integrates the functionality of the all of the components of a typical end plate assembly including a filter element end cap, a nut plate, a retainer ring, a spring, and a gasket. As shown in FIG. 1, the end plate 200 is engaged with and coupled to an upper end 116 (e.g., top end as shown in FIG. 1, a second end, etc.) of the media pack and secures the filter element 104 in position with respect to the filter head 12. In other words, the end plate 200 prevents movement of the filter element 104 relative to the filter head 12 in a direction that is substantially parallel to a central axis 118 of the filter element 104. In the example embodiment of FIG. 1, the end plate 200 is cast (e.g., die cast) or otherwise formed from a single piece of material (e.g., metal such as aluminum, steel, etc.). In other embodiments, the end plate is molded or otherwise formed from a plastic material. In yet other embodiments, the end plate includes a combination of different materials that are integrally formed as a single unitary component.

As used herein, "integrally formed as a single unitary component/body/structure" refers to a component that is formed as a single integrated piece or that is formed from multiple pieces that are inseparable from one another without damage or destruction of the component. For example, the component may be molded or otherwise formed as a single component from a single piece of material that is not formed by the coupling of separately formed components. In other example, where multiple pieces are used, the "integrally formed" component may be an overmolded component such as an end cap made from a plastic material that is overmolded onto a metal nut plate so that the end cap cannot be separated from the nut plate without a destruction of the component.

Figure 2:
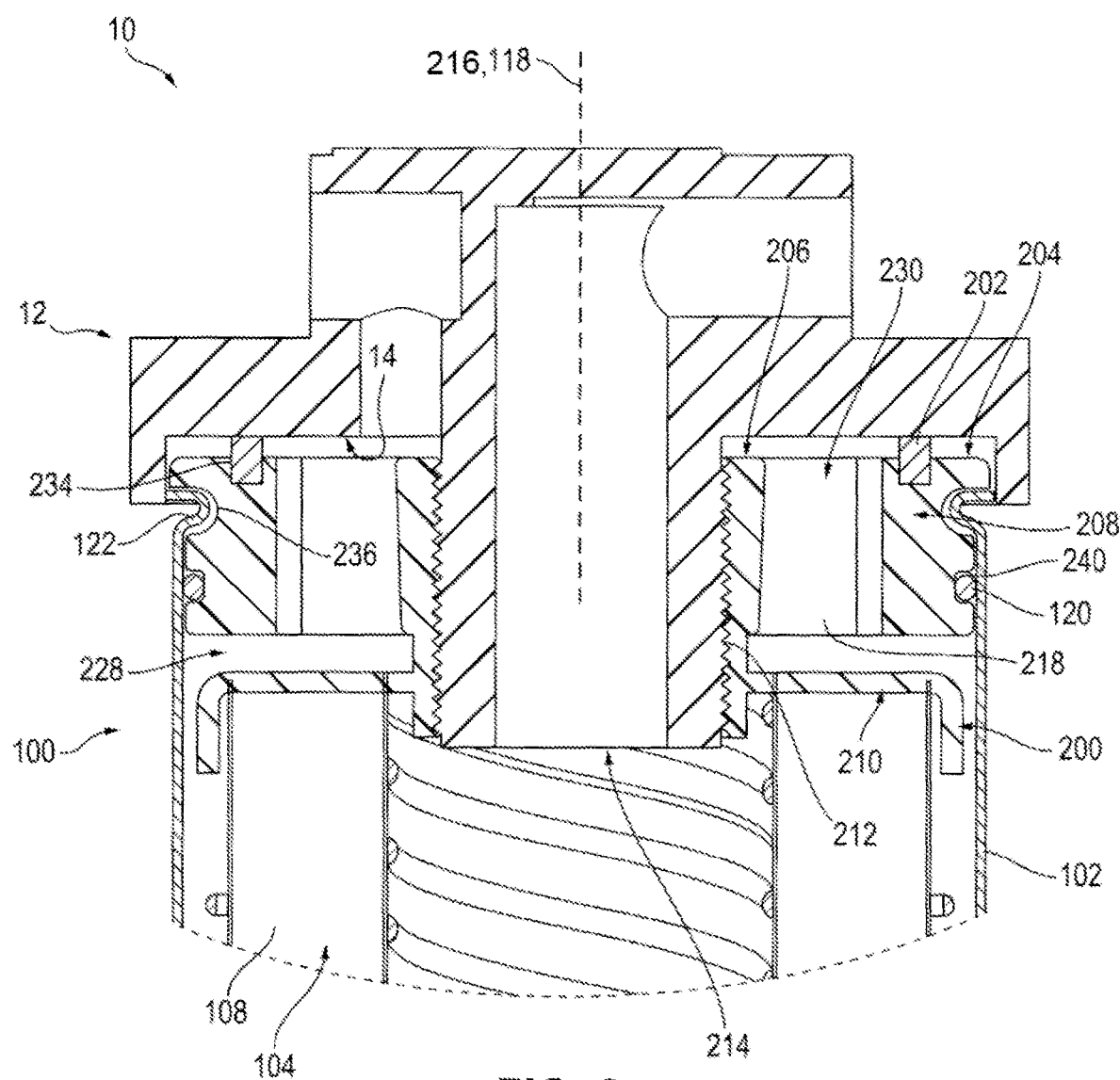
FIG. 2 is a reproduction of FIG. 1 at a location near where the spin-on filter cartridge assembly engages the filter head.

FIG. 2 is an enlarged view of the liquid filtration system 10 near an interface between the filter cartridge 100 and the filter head 12. The end plate 200 is sealingly engaged with the upper end 116 of the media pack 108 (e.g., via epoxy, glue, or another suitable adhesive product). In other words, the end plate 200 is directly mechanically connected to the upper end 116 and seals the clean side of the filter element 104 from the dirty side of the filter element 104 at the upper end 116. For example, the upper end 116 of the media pack 108 may be potted into the end plate 200 (e.g., via a curable resin), bonded to the end plate 200 using an adhesive product, or otherwise sealingly engaged with the end plate 200. The end plate 200 is also threadably coupled to the filter head 12. A sealing member 202 (e.g., a gasket, etc.) is sandwiched or otherwise disposed between an upper surface 204 of the end plate 200 and a lower surface 14 of the filter head 12. The sealing member 202 is compressed between the upper surface 204 and the lower surface 14 and seals against both the upper surface 204 of the end plate 200 and the lower surface 14 of the filter head 12 to prevent dirty fuel from leaking into an environment surrounding the filter cartridge 100. The filter cartridge 100 also includes a second sealing member 120 (e.g., an O-ring, etc.) that is sandwiched or otherwise disposed in an annular gap between the end plate 200 and the shell 102. The second sealing member 120 is compressed radially between the shell 102 and the end plate 200 to prevent fluid leakage into the environment surrounding the filter cartridge 100.

Figure 3:
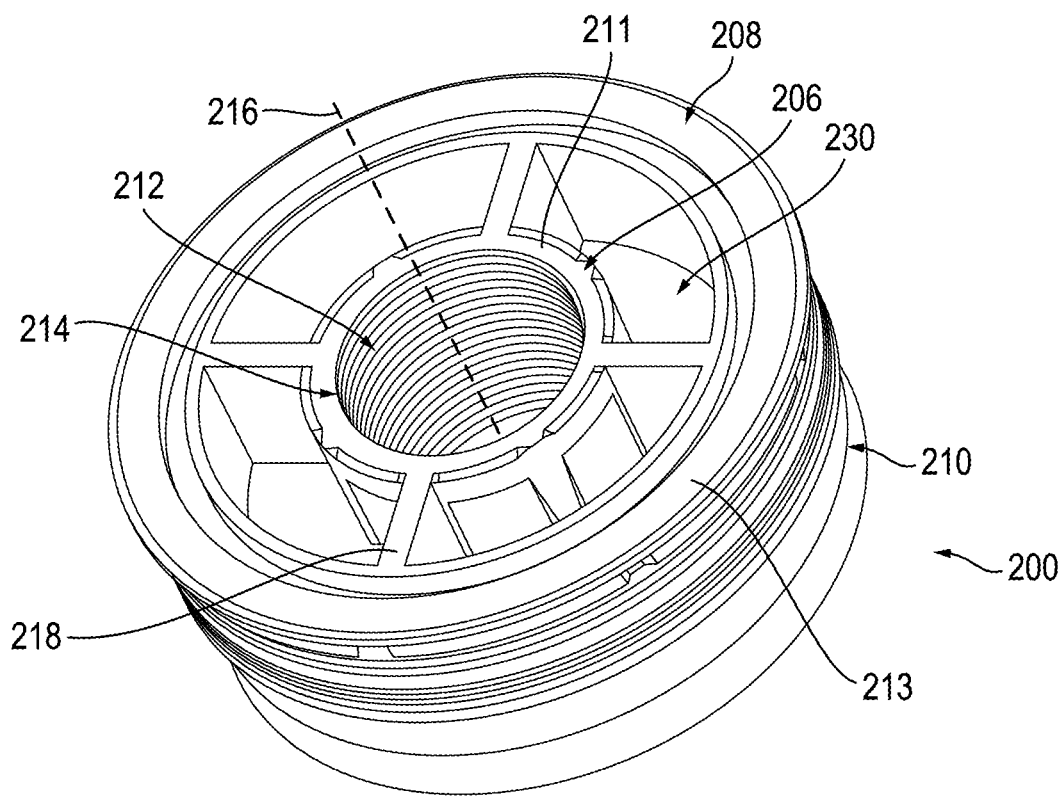
FIG. 3 is a perspective view of an end plate of the spin-on filter cartridge assembly of FIG. 1.
Figure 4:
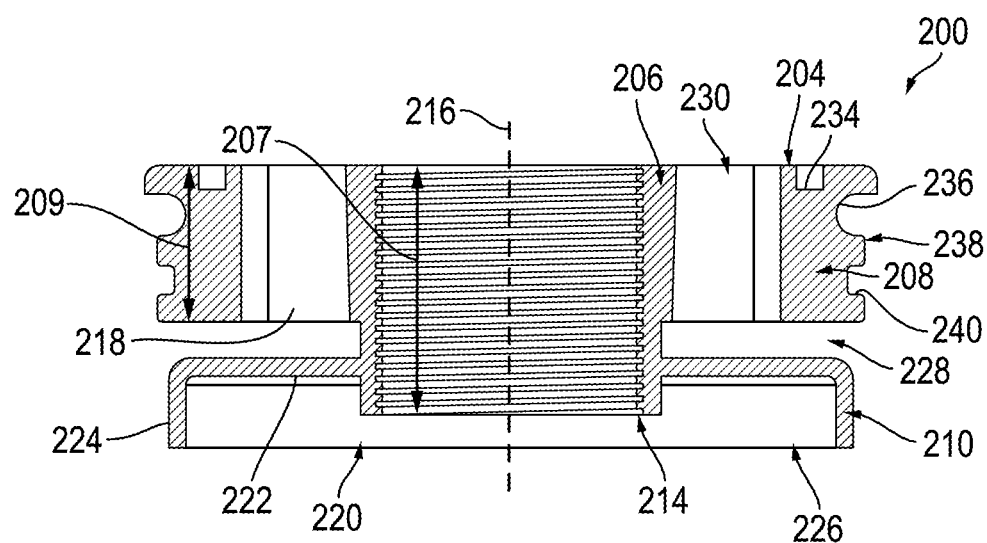
FIG. 4 is a side cross-sectional view of the end plate of FIG. 3.

FIGS. 3 and 4 are perspective and side cross-sectional views of the end plate 200, respectively. The end plate 200 includes an inner body portion 206, an outer body portion 208, and an end cap portion 210. The inner body portion 206 is structured connect the filter cartridge 100 to the filter head 12 (see also FIG. 2). The inner body portion 206 includes a threaded portion 212 that extends in a substantially parallel orientation relative to the central axis 216 of the end plate 200. The threaded portion 212 includes a through-hole opening 214 extending through the inner body portion 206 from an upper end of the inner body portion 206 to a lower end of the inner body portion 206 opposite from the upper end. The threaded portion 212 also includes a threaded interface extending along an inner surface of the through-hole opening 214.

The outer body portion 208 is structured to couple the filter element 104 to the shell 102 and to sealingly engage the end plate 200 with an interior surface of the shell 102 proximate to the open end of the shell 102 (see FIGS. 1 and 2). As shown in FIGS. 3 and 4, the outer body portion 208 is spaced apart from the inner body portion 206 in a radial direction relative to a central axis 216 of the end plate 200. The inner body portion 206 is disposed within the outer body portion 208 in substantially coaxial arrangement with respect to the outer body portion 208. As shown in FIG. 4, an upper surface 211 of the inner body portion 206 is approximately coplanar (e.g., flush, etc.) with an upper surface 213 of the outer body portion 208. The inner body portion 206 extends through the outer body portion 208 and protrudes axially beyond a lower end of the outer body portion 208 such that an axial height 207 of the inner body portion 206 is greater than an axial height 209 of the outer body portion 208. The inner body portion 206 is coupled to and supported by a plurality of extension pieces 218 that extend radially between the inner body portion 206 and the outer body portion 208 (e.g., substantially radially relative to the central axis 216 of the end plate 200).

The end cap portion 210 is structured to couple the media pack 108 to the end plate 200 and to sealingly engage the media pack 108 (see FIG. 2) to prevent fluid bypass between the clean side of the filter element 104 and the dirty side of the filter element 104. As such, the end cap portion 210 may be considered an integral part of the filter element 104. As shown in FIG. 4, the end cap portion 210 of the end plate 200 is engaged with and coupled to the inner body portion 206 at an intermediate position proximate to a distal end 220 (e.g., bottom end as shown in FIG. 4, a lower end, etc.) of the inner body portion 206. The end cap portion 210 includes an annular portion 222 (e.g., annular wall, etc.) extending radially away from the distal end 220 and an axial extension 224 extending from a lower surface of the annular portion 222, in an axial direction away from the outer body portion 208 (e.g., away from the filter head 12 and toward a closed end of the shell 102 as shown in FIGS. 1 and 2). The axial extension 224 is disposed along an outer perimeter edge of the annular portion 222 and extends in a circumferential direction along the outer perimeter edge. As shown in FIG. 4, the annular portion 222 and the axial extension 224 together define a downward facing, "U" shaped recessed area 226 that is sized to receive the upper end of the media pack 108 therein. The annular portion 222 of the end cap portion 210 is spaced apart from the outer body portion 208 defining a gap therebetween (e.g., a gap between an upper surface of the annular portion 222 and a lower surface of the outer body portion 208). The gap is an annular channel 228 that extends radially away from the inner body portion 206.

As shown in FIGS. 3 and 4, the through-hole opening 214 of inner body portion 206 (e.g., the threaded portion 212) defines an inner fluid passageway structured to guide clean fuel from the clean side of the filter element 104 back into the filter head 12 (see also FIGS. 1 and 2). A radial gap between the inner body portion 206 and the outer body portion 208 defines a plurality of outer fluid passageways 230 that extend in an axial direction between the inner body portion 206 and the outer body portion 208. The outer fluid passageways 230 are fluidly separated (e.g., isolated, etc.) from the inner fluid passageway (e.g., through-hole opening 214 by the inner body portion 206). Each of the outer fluid passageways 230 are at least partially separated from one another by the extension pieces 218 between the inner body portion 206 and the outer body portion 208. In the embodiment of FIG. 3, the end plate 200 includes four extension pieces 218 defining four outer fluid passageways 230 spaced at approximately equal intervals in a circumferential direction between the inner body portion 206 and the outer body portion 208. In other embodiments, the end plate 200 may include additional or fewer outer fluid passageways 230.

As shown in FIG. 2, dirty fuel entering the filter cartridge 100 from the filter head 12 is distributed into the outer fluid passageways 230, which guide the fuel in an axial direction (e.g., in a substantially parallel orientation relative to the central axis 118 of the end plate 200 and the filter element 104, vertically downward as shown in FIG. 2) between the inner body portion 206 and the outer body portion 208 and then radially outward through the annular channel 228 between the outer body portion 208 and the end cap portion 210 and into an annular space between the dirty side of the filter element 104 and the shell 102. Together, an outer wall of the inner body portion 206 and the annular portion 222 of the end cap portion 210 prevent fluid bypass between the clean and dirty sides of the filter element 104.

As shown in FIG. 4, the end plate 200 includes a plurality of channels (e.g., grooves, recessed areas, etc.) including an upper channel 234 disposed in the upper surface 204 of the end plate 200, a first outer channel 236 disposed in an outer surface 238 (e.g., a radially outward facing surface) of the outer body portion 208 and extending circumferentially along a perimeter of the outer body portion 208, and a second outer channel 240 disposed in the outer surface 238 below the first outer channel 236. In the example embodiment of FIG. 4, the upper channel 234 is disposed in an upper surface of the outer body portion 208 such that the upper channel 234 is positioned radially outward from and substantially surrounds the through-hole opening 214 of the inner body portion 206 and the outer fluid passageways 230. As shown in FIG. 2, the upper channel 234 and the second outer channel 240 are sized to receive sealing members (e.g., sealing elements, O-rings, gaskets, etc.) therein to prevent fuel from leaking out from the filter cartridge 100 into the surrounding environment (see FIG. 2). The first outer channel 236 is structured to receive a crimped portion 122 (e.g., bent portion, flange, etc.) of the shell 102 to couple the end plate 200 and filter element 104 to the shell 102 (and to secure the filter element 104 in position with respect to the shell 102).

Figure 5:
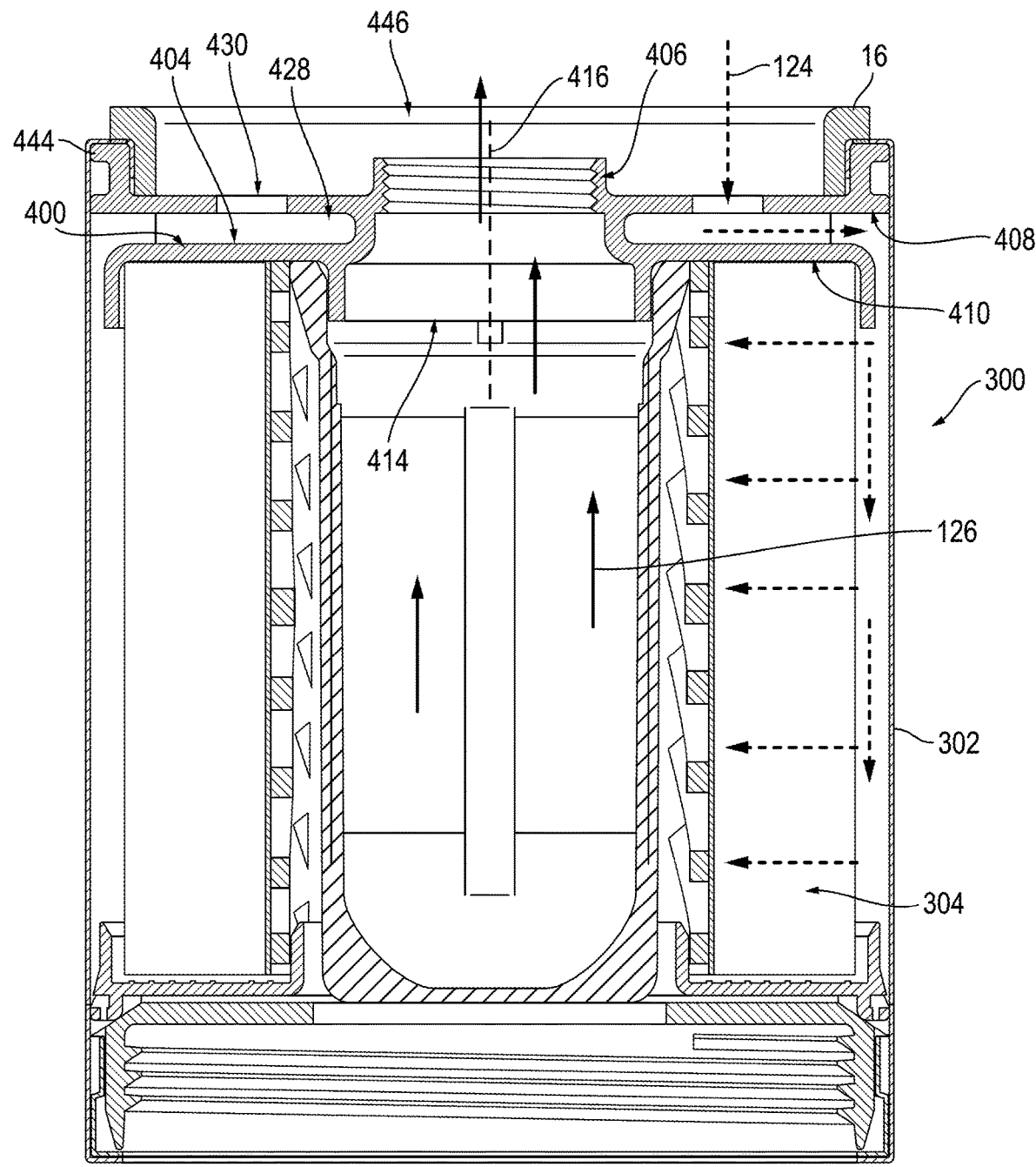
FIG. 5 is a side cross-sectional view of a second example spin-on filter cartridge assembly.
Figure 6:
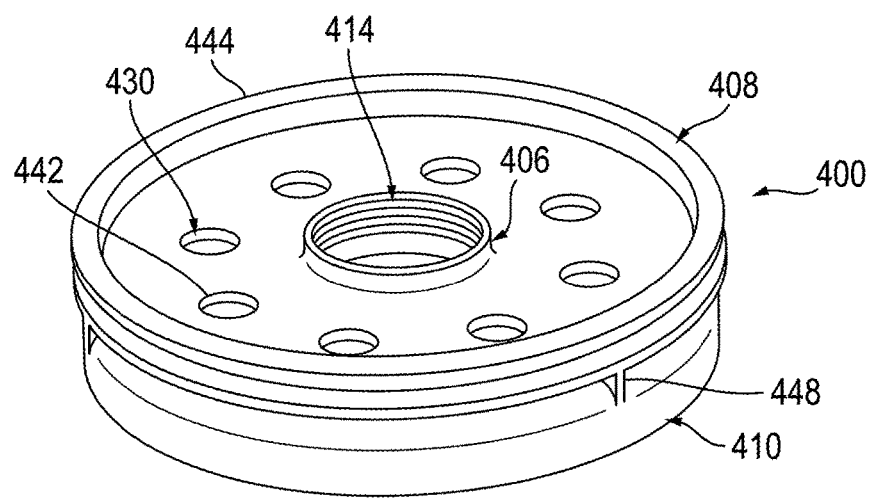
FIG. 6 is a perspective view of an end plate of the spin-on filter cartridge assembly of FIG. 5.
Figure 7:
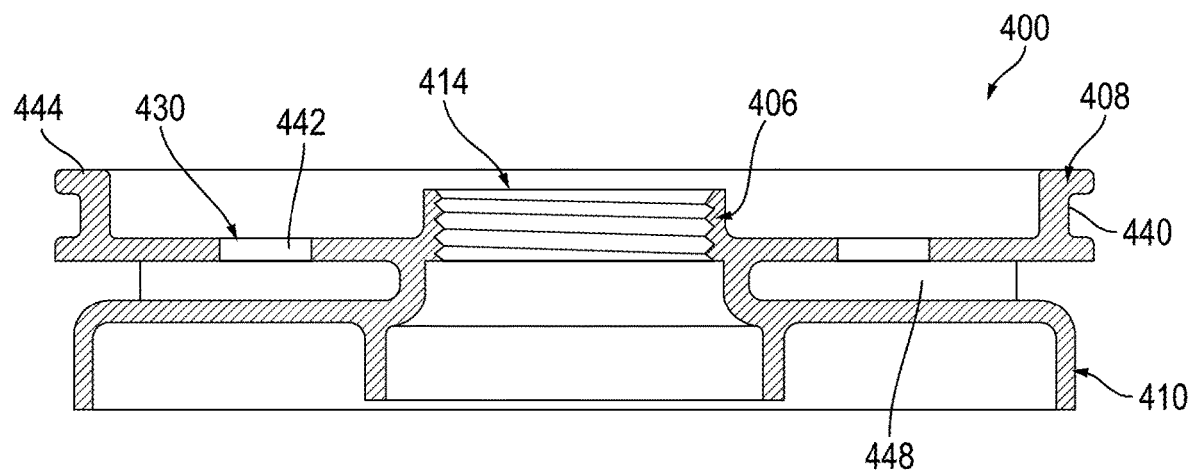
FIG. 7 is a side cross-sectional view of the end plate of FIG. 6.

The combination of features shown in the example cartridge of FIGS. 1 and 2 should not be considered limiting, and a variety of alternatives are possible without departing from the inventive concepts disclosed herein. For example, FIG. 5 is a side perspective view of another example spin-on filter cartridge 300. The cartridge 300 of FIG. 5 is structured to engage (e.g., threadably engage) with a clear bowl or an otherwise transparent, partially transparent, or translucent reservoir that receives separated water from the cartridge 300. As with the filter cartridge 100 of FIGS. 1-4, the cartridge 300 of FIG. 5 also includes a single piece end plate 400 that is structured to sealingly engage a filter element 304 to a filter head and to threadably couple the filter element 304 to the filter head. FIGS. 6 and 7 show the end plate 400 isolated from other components of the filter cartridge 300. Similar to the end plate 200 of FIGS. 3 and 4, the end plate 400 of FIGS. 6 and 7 includes an inner body portion 406, and outer body portion 408, and an end cap portion 410. The inner body portion 406 includes a through-hole opening that defines an inner fluid passageway 414. The outer body portion 408 defines a plurality of outer fluid passageways 430 (e.g., outer channels, etc.) each fluidly separated (e.g., isolated) from the inner fluid passageway 414. The outer fluid passageways 430 are at least partially defined by a plurality of circular openings 442 extending through an upper surface 404 of the end plate 400 in a substantially parallel orientation relative to a central axis 416 of the end plate 400. The shape, size, number, and arrangement of openings 442 may differ in various example embodiments.

As shown in FIGS. 6 and 7, the outer body portion 408 of the end plate 400 includes an outer flange 444 disposed at an outer perimeter edge of the outer body portion 408 and extending axially upward from the outer perimeter edge. The flange 444 defines an outer channel 440 (see FIG. 7) that is sized to receive a sealing member therein to sealingly engage the end plate 400 to an inner surface of a shell 302 (see FIG. 5). As shown in FIG. 5, an upper surface of the outer body portion 408 and the flange 444 together define a recessed area 446 (e.g., channel, etc.) sized to receive the filter head 16 therein. The shell 302 is engaged with and coupled to the outer body portion 408 to retain the filter element 304 within the shell 302. In particular, an upper perimeter edge of the shell 302 is wrapped or otherwise formed around the flange 444 to couple the outer body portion 408 to the shell 302 and to retain the filter element 304 within the shell 302.

As shown in FIGS. 6-7, the outer body portion 408 is coupled to the inner body portion 406, which connects the outer body portion 408 to the end cap portion 410. The outer body portion 408 is spaced axially apart from the end cap portion 410 to define an annular channel 428 therebetween. The outer body portion 408 is also coupled to the end cap portion 410 by a plurality of support members 448 that engage an outer surface of the inner body portion 406 and extend radially outwardly from the inner body portion 406 through the annular channel 428. The support members 448 are radial support walls that couple a lower surface of the outer body portion 408 to an upper surface of the end cap portion 410. The support members 448 extend outwardly beyond the outer fluid passageways 430 such that an outer radius of the support members 448 is greater than an outer radial position of the outer fluid passageways 430. In other embodiments, the radial position of the support members 448 may be different. In the embodiment of FIGS. 6 and 7, the end plate 400 includes four support members 448 that are spaced in approximately equal intervals along the circumferential direction. In other embodiments, the end plate 400 may include additional or fewer support members 448 and/or the spacing between adjacent support members 448 may be different.

As shown in FIG. 5, dirty fluid 124 (e.g., fuel) enters the cartridge 300 from the filter head 16 through the outer fluid passageways 430. The dirty fluid 124 passes through the annular channel 428 and into an annular gap between the shell 302 and the filter element 304. The dirty fluid 124 then passes through and is filtered by the filter element 304 and then returns as clean fluid 126 through the inner fluid passageway 414 (e.g., in an axial direction) to the filter head 16.

Figure 9:
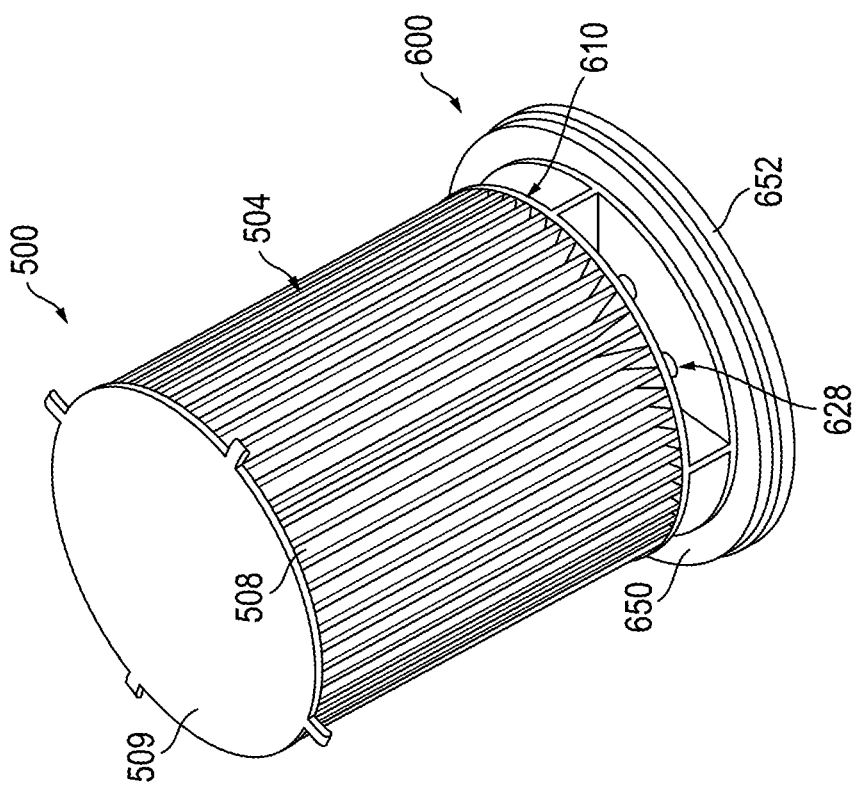
FIG. 9 is an upper perspective view of the spin-on filter cartridge assembly of FIG. 8.
Figure 8:
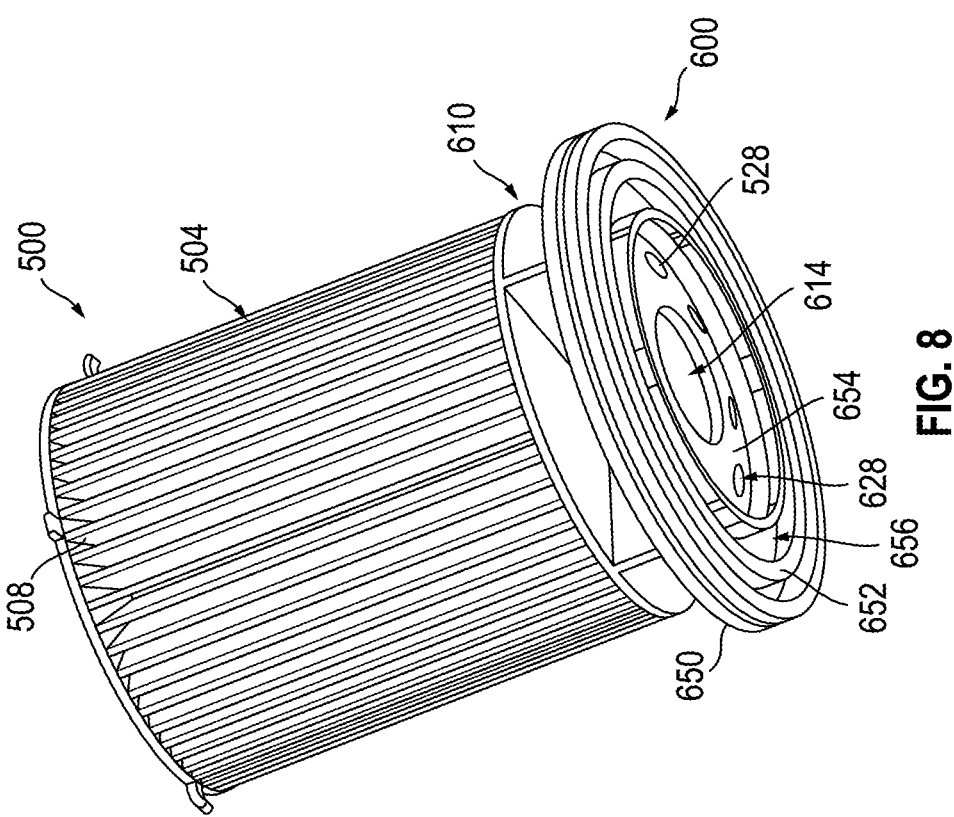
FIG. 8 is a lower perspective view of a third example spin-on filter cartridge assembly.

FIGS. 8 and 9 show perspective views of a third example spin-on filter cartridge 500. Like other embodiments described herein, the cartridge 500 includes an end plate 600 with a reduced number of assembly components. The end plate 600 is disposed at a first end of a media pack 508. The cartridge 500 also includes a closed end cap 509 (e.g., a die cut end cap) disposed at a second end of the media pack 508 and sealingly engaged with the second end to prevent flow across the second end. As shown in FIGS. 8 and 9, the end plate 600 includes a die casted end cap portion 610 (e.g., an upper portion as shown in FIG. 8), a nut plate 650, and a retainer 652. The nut plate 650 defines an inner fluid passageway 614 at a central position along the nut plate 650 and an opening 528 spaced radially apart from the inner fluid passageway 614. The media pack 508 is at least partially embedded into the end cap portion 610. The end cap portion 610 is made from a plastic material that is overmolded onto at least one of the retainer 652 and the nut plate 650. In the third example spin-on filter cartridge 500 of FIGS. 8-9, the end cap portion 610 is overmolded onto the nut plate 650, through the openings 528 in the nut plate 650 that are aligned with and/or partially define the outer fluid passageways 628 in the end plate 600. The end cap portion 610 may extend through the openings 528 and onto an opposing surface of the nut plate 650 (e.g., a surface of the nut plate 650 that faces away from the filter element 504), such that the nut plate 650 is "sandwiched" or otherwise disposed between different portions of the end cap portion 610 proximate to the outer fluid passageways 628. The end cap portion 610 extends through the openings 528 and defines the outer fluid passageways 628, which are substantially concentric with a central axis of the openings 528. In some embodiments, the openings 528 in the nut plate 650 are oversized to accommodate the loss in diameter due to the overmolded plastic from the end cap portion 610. In other embodiments, the end cap portion 610 may be overmolded onto another portion of the nut plate 650.

The retainer 652 is welded (e.g., spot welded) or otherwise coupled to a lower surface 654 of the nut plate 650 that faces away from the end cap portion 610 and the filter element 504. The retainer 652 may be coupled to the nut plate 650 either before or after the end cap portion 610 is coupled to the nut plate 650. As shown in FIG. 8, the retainer 652 defines a channel 656 (e.g., grooves, recessed areas, etc.) that is sized to receive a sealing member (e.g., gasket, O-ring, etc.) therein to sealingly engage the cartridge 500 with a filter head.

Figure 11:
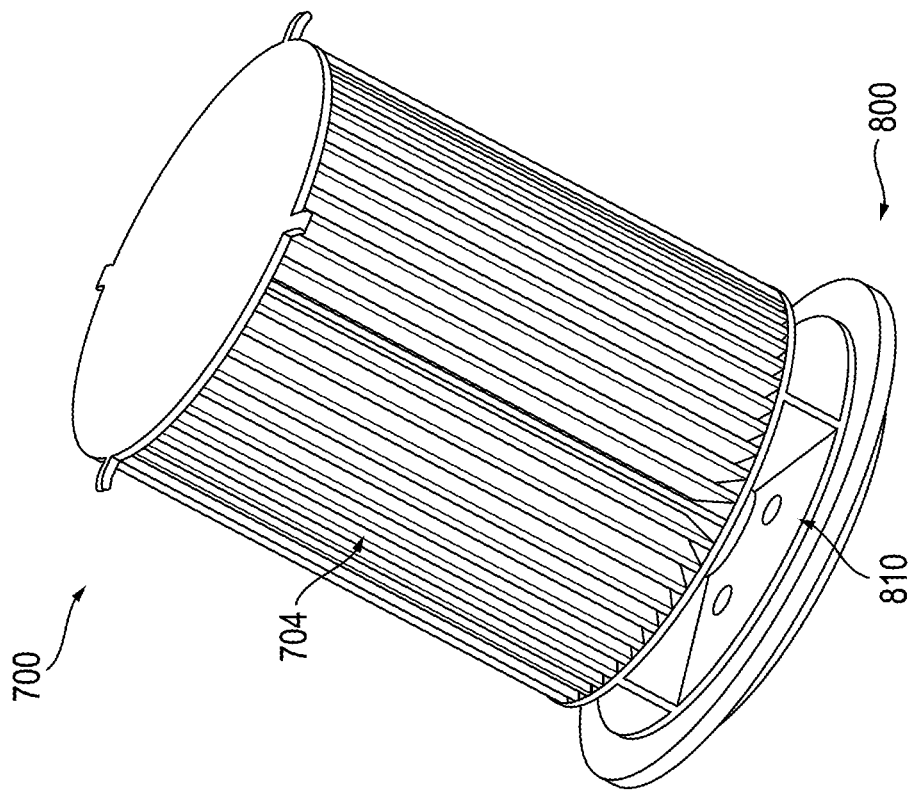
FIG. 11 is an upper perspective view of the spin-on filter cartridge assembly of FIG. 10.
Figure 10:
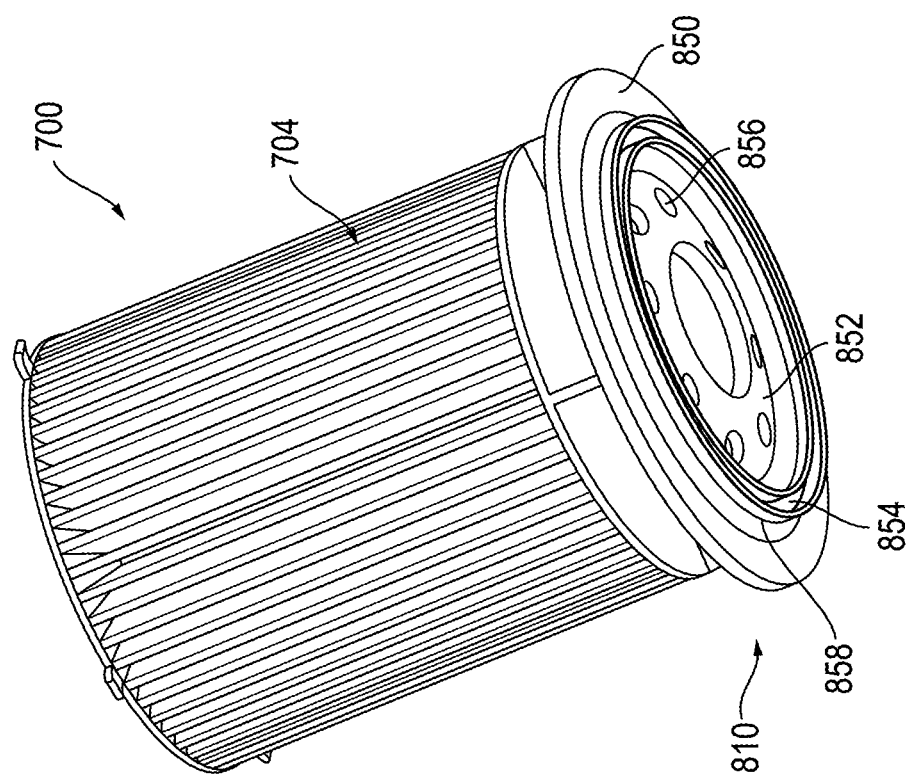
FIG. 10 is a lower perspective view of a fourth example spin-on filter cartridge assembly.

FIGS. 10-11 show perspective views of a fourth example spin-on filter cartridge 700. The cartridge 700 includes an end plate 800 having an end cap portion 810 (e.g., upper portion as shown in FIG. 10) and a nut plate 850. Unlike the embodiment of FIGS. 8 and 9, the retainer element of FIGS. 10 and 11 is formed onto the nut plate 850 by the end cap portion 810 such that no separate retainer is required. The end cap portion 810 may be overmolded onto the nut plate 850 and extend at least partially into the openings 856 of the nut plate 850 as described with reference to FIGS. 8 and 9. Additionally, the plastic material from the end cap portion 810 is directed (e.g., molded) through a circumferential slot 858 on the nut plate 850 to form a retainer, thereby eliminating the need for a separate welding or forming operation to couple a retainer to the nut plate. The material of the end cap portion 810 passes through the circumferential slot 858 and onto a lower surface 852 of the nut plate 850 that faces away from the end cap portion 810 and the filter element 704. During the overmolding operation, a separate die may be positioned adjacent to the circumferential slot 858 to form a channel 854 (e.g., a downward facing channel as shown in FIG. 10, a groove, a substantially "U" shaped recessed area, etc.). The channel 854 is sized to receive a sealing member therein to sealingly engage the cartridge 700 with the filter head.

Figure 13:
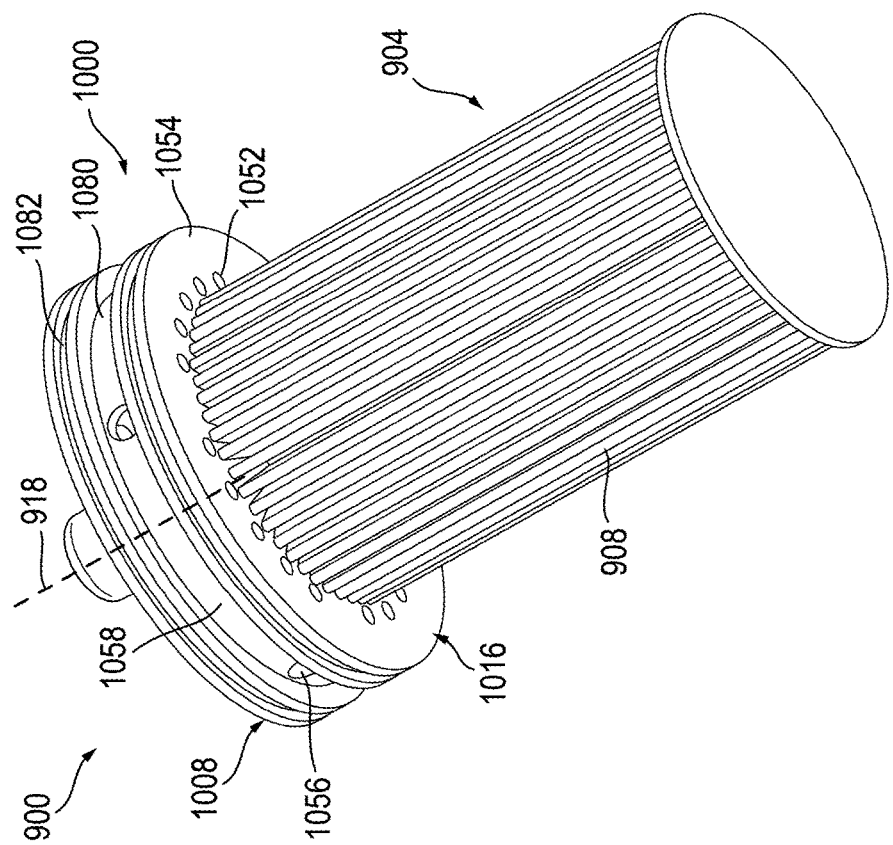
FIG. 13 is a lower perspective view of the spin-on filter cartridge assembly of FIG. 12.
Figure 12:
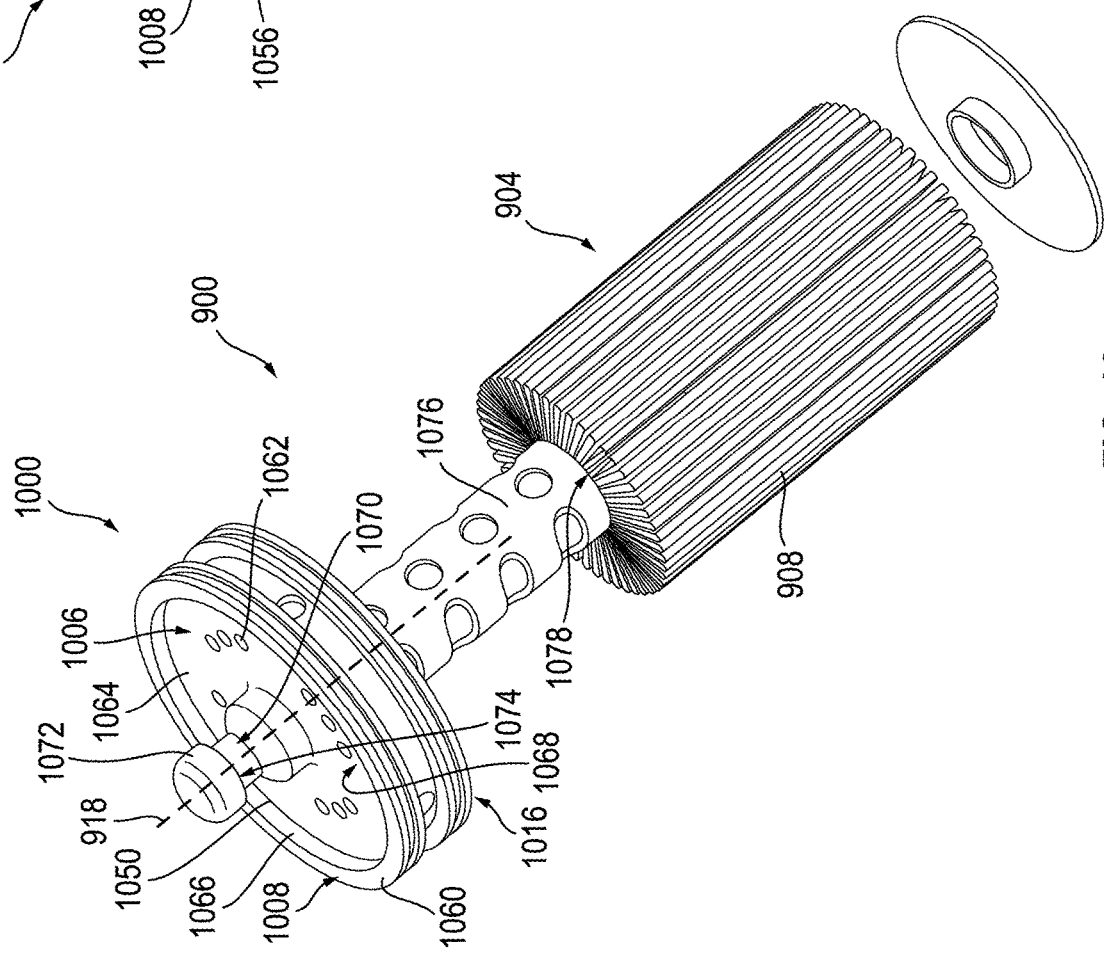
FIG. 12 is an exploded perspective view of a fifth example spin-on filter cartridge assembly.

FIGS. 12 and 13 show a fifth example spin-on filter cartridge 900. The cartridge 900 includes an end plate 1000 including an inner body portion 1006 and an outer body portion 1008 that is coupled to the inner body portion 1006. As shown in FIG. 12, the outer body portion 1008 defines a cylindrically-shaped recessed portion 1050 (e.g., interior space, etc.) that is sized to receive the inner body portion 1006 therein such that the inner body portion 1006 is disposed within and substantially surrounded by the outer body portion 1008. As shown in FIG. 12, an upper wall 1064 of the inner body portion 1006 is set into (e.g., recessed below) an upper surface 1060 (e.g., an axial end facing surface) of the outer body portion 1008 to define a ledge 1066. The ledge 1066 and the upper wall 1064 together define a recessed area 1068 that is sized to receive a filter head therein. In some embodiments, the ledge 1066 is sized to sealingly engage the filter head to prevent fluid from leaking into an environment surrounding the filter cartridge 900.

As shown in FIG. 12, the inner body portion 1006 also includes a connecting member 1070 that detachably couples the cartridge 900 to the filter head. The connecting member 1070 is a cylindrical extension that is disposed at a central position along the upper wall 1064 in substantially coaxial arrangement with the upper wall 1064. The connecting member 1070 extends axially away from the upper wall 1064 and away from the filter element 904. The connecting member 1070 includes a head portion 1072 disposed at an upper end of the connecting member 1070 and spaced apart from the upper wall 1064. The head portion 1072 defines a ledge 1074 that extends radially away from a central axis of the connecting member 1070 (e.g., the central axis 918). The filter head may include a latch, clip, or other connecting mechanism that is designed to grab onto the head portion 1072 to detachably engage the cartridge 900 to the filter head.

As shown in FIG. 12, an end cap portion 1016 of the end plate 1000 is integrally formed with the outer body portion 1008 (e.g., lower wall 1054) as a single unitary body. The end cap portion 1016 is sealingly engaged to an axial end of the media pack 908. The outer body portion 1008 also includes a center tube 1076 that is integrally formed with the lower wall 1054 (e.g., end cap portion 1016). The center tube 1076 is a cylindrically-shaped extension (e.g., a hollow cylindrical tube) that is disposed at a central position along the lower wall 1054. The center tube 1076 extends axially away from the lower wall 1054 and toward the filter element. The center tube 1076 is sized to be received within a hollow interior portion 1078 of the media pack 908 to provide structural support against compressive loading (e.g., due to the pressure drop across the media pack 908 associated with fluid flow through the media pack 908). The center tube 1076 is perforated to allow flow to pass through the center tube 1076 and return from a clean side of the media pack 908 to the end plate 1000.

As shown in FIGS. 12 and 13, the end plate 1000 includes (e.g., defines) three sets of openings to control the flow of fluid into and out of the cartridge 900 (e.g., to and from a filter head). A first set (e.g., plurality) of openings 1052 (e.g., circular holes) is disposed on a lower wall 1054 of the outer body portion 1008 and is configured to provide fluid (e.g., fuel) to a dirty side of a media pack 908 (e.g., a cylindrically-shaped media pack 908 as shown in FIGS. 12 and 13). The first set of openings 1052 are located farther (e.g., at a greater radial distance) from a central axis 918 of the filter cartridge 900 than the media pack 908 and extend axially through the lower wall 1054 such that fluid passing through the first set of openings 1052 rains down from the end plate 1000 into an annular space between the media pack 908 and a shell housing (not shown). As shown in FIG. 13, the first set of openings 1052 are arranged along a circumferential direction. The first set of openings 1052 are subdivided into four separate groups that are spaced in approximately equal intervals along the perimeter of the lower wall 1054. Each group includes a plurality of the first set of openings 1052 that are spaced approximately equally apart from one another. As shown in FIG. 13, the spacing of adjacent openings 1052 within each group is different (e.g., less than) from the spacing between adjacent groups. In other embodiments, each one of the first set of openings 1052 is spaced approximately equally along the perimeter of the lower wall 1054.

A second set of openings 1056 (e.g., circular holes) is disposed on a circumferential wall 1058 (e.g., a radially outward facing surface) of the outer body portion 1008. The second set of openings 1056 are along an outer perimeter of the lower wall 1054 in approximately equal intervals along the circumferential wall 1058. The circumferential wall 1058 extends axially away from the lower wall 1054, upwardly from the lower wall 1054 and away from the media pack 908. The second set of openings 1056 are disposed at an intermediate position (e.g., central position, etc.) along the circumferential wall 1058, approximately half-way between the lower wall 1054 and an upper surface 1060 (e.g., axial end surface) of the circumferential wall 1058. Each one of the second set of openings 1056 extends in a substantially radial direction through the circumferential wall 1058 relative to a central axis 918 of the cartridge 900. In the embodiment of FIGS. 12 and 13, the second set of openings 1056 are fluidly coupled to the first set of openings 1052 by a hollow region between an inner surface of the outer body portion 1008 and an outer surface of the inner body portion 1006. The second set of openings 1056 is configured to direct liquid from a filter head (not shown) to the first set of openings 1052. As shown in FIG. 12, the circumferential wall 1058 defines a channel 1080 (e.g., groove) that extends across the second set of openings 1056 to help distribute flow between the second set of openings 1056. The circumferential wall 1058 also includes grooves 1082 above and below the channel 1080. The grooves 1082 are sized to receive a sealing member therein to sealingly engage the shell (not shown) and/or filter head and to prevent liquid from bypassing to the clean side of the cartridge 900 and to prevent fluid from leaking into an environment surrounding the cartridge 900.

As shown in FIG. 12, a third set of openings 1062 is disposed on an upper wall 1064 of the inner body portion 1006. Each one of the third set of openings 1062 extends in a substantially axial direction through the upper wall 1064 relative to the central axis 918 of the cartridge 900 (and end plate 1000). The third set of openings 1062 is fluidly coupled to a flow channel defined by the center tube 1076 (e.g., a flow channel defined by the hollow portion of the center tube 1076 and leading to a clean side of the media pack 908, a central opening that is at least partially surrounded by the first set of openings 1052) and may be configured to provide clean fuel from the clean side of the media pack 908 to the filter head. The inner body portion 1006 may define a hollow interior space that fluidly connects the flow channel with the third set of openings 1062. As such, the inner body portion 1006 may sealingly engage the outer body portion 1008 along the lower wall 1054, proximate to the center tube 1076. As shown in FIG. 12, the third set of openings 1062 is arranged in four groups, each with multiple openings 1062 that extend in a circumferential direction along the upper wall 1064. The groups are spaced at approximately equal intervals along the perimeter of the upper wall 1064. Each group is disposed at an intermediate radial position between the central axis 918 and the outer perimeter edge of the upper wall 1064. Similar to the first set of openings 1052, the spacing between adjacent openings 1062 of the third set of openings 1062 within each group is different from (e.g., less than) the spacing between adjacent groups. In other embodiments, the spacing, number, and/or arrangement of the third set of openings 1062 may be different.

The spin-on filter cartridge assemblies, of which various example embodiments are described herein, provide several advantages over existing devices. The cartridges may include a single piece end plate that is designed in such a way as to minimize the overall number of components used in the cartridge. The end plate is configured to couple a filter element to both a shell of the cartridge and a filter head of a liquid filtration system. The end plate secures the filter element in position with respect to the shell and guides fluid to and from the filter element and the filter head. Among other benefits, the end plate eliminates the need for gaskets that are typically required to seal the filter element to an end plate assembly of the spin-on cartridge and to fluidly isolate the dirty side of the filter element from the clean side. Moreover, because the end plate is sealingly engaged with the media pack of the filter element, the end plate eliminates the need for springs to maintain the filter element in compression with other parts of the cartridge. The end plate construction also allows the cartridge to operate with much higher differential pressures than can be achieved using springs and gaskets.

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "approximately," "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language a "portion" is used, the item can include a portion and/or the entire item unless specifically stated to the contrary.

What is claimed is:

1. A spin-on filter cartridge assembly, comprising: a shell defining an interior cavity; a filter element disposed within the interior cavity, the filter element comprising filter media; and an end plate coupled to the shell and sealingly engaged with the filter media, the end plate retaining the filter element within the interior cavity, the end plate comprising: a nut plate engaged with the shell; and an end cap portion engaged with the filter media and overmolded onto the nut plate; wherein the end plate is integrally formed as a single unitary body.

2. The spin-on filter cartridge assembly of claim 1, wherein the end plate comprises:
an inner body portion defining an inner fluid passageway;
an outer body portion coupled to the inner body portion and spaced radially apart from the inner body portion to define an outer fluid passageway, the inner fluid passageway fluidly separated from the outer fluid passageway by the inner body portion, the end cap portion coupled to one of the inner body portion or the outer body portion, the end cap portion sealingly engaged with the filter media.

3. The spin-on filter cartridge assembly of claim 2, wherein the end cap portion comprises an annular wall that is engaged with and extends radially away from the inner body portion.

4. The spin-on filter cartridge assembly of claim 2, wherein at least part of the end cap portion is spaced axially apart from the outer body portion to define an annular channel that extends radially away from the inner body portion.

5. The spin-on filter cartridge assembly of claim 4, wherein the annular channel is fluidly connected to the outer fluid passageway.

6. The spin-on filter cartridge assembly of claim 2, wherein the outer fluid passageway is separated from the inner fluid passageway by both the inner body portion and the end cap portion.

7. The spin-on filter cartridge assembly of claim 1, wherein the nut plate is coupled to the shell, and the end cap portion is sealingly engaged with the filter media.

8. The spin-on filter cartridge assembly of claim 7, wherein the nut plate defines an inner fluid passageway at a central position along the nut plate and an opening spaced radially apart from the inner fluid passageway, the end cap portion extending through the opening and defining an outer fluid passageway at the opening.

9. The spin-on filter cartridge assembly of claim 7, wherein the nut plate defines a circumferential slot, wherein the end cap portion passes through the circumferential slot and onto a lower surface of the nut plate that faces away from the filter media, the end cap portion forming a channel along the lower surface.

10. The spin-on filter cartridge assembly of claim 1, wherein the end plate comprises:
a first set of openings disposed on a lower wall of the end plate;
a second set of openings disposed on a circumferential wall of the end plate and fluidly coupled to the first set of openings;
a third set of openings disposed on an upper wall of the end plate;
a central opening at least partially surrounded by the first set of openings, the central opening fluidly coupled to the third set of openings.

11. The spin-on filter cartridge assembly of claim 1, wherein the end plate comprises a lower wall and a center tube that is integrally formed with the lower wall and extends axially away from the lower wall.

12. A filter element of a spin-on filter cartridge assembly, comprising: filter media that is configured to filter a fluid passing therethrough, the filter media having a first side and a second side; and an end plate sealingly engaged with the filter media, the end plate comprising: a nut plate defining an inner fluid passageway, the inner fluid passageway fluidly coupled to the first side; an outer fluid passageway spaced radially apart from the inner fluid passageway and fluidly coupled to the second side; and an end cap portion engaged with the filter media and overmolded onto the nut plate; wherein the end plate is integrally formed as a single unitary body.

13. The filter element of claim 12, wherein the end plate further comprises an annular channel that is fluidly coupled to the outer fluid passageway.

14. The filter element of claim 12, wherein the end cap portion is sealingly engaged with the filter media.

15. The filter element of claim 14, wherein the nut plate defines a circumferential slot, wherein the end cap portion passes through the circumferential slot and onto a lower surface of the nut plate that faces away from the filter media, the end cap portion forming a channel along the lower surface.

16. A filtration system, comprising: a filter head; and a spin-on filter cartridge assembly, comprising: a shell defining an interior cavity; a filter element disposed within the interior cavity, the filter element comprising filter media; and an end plate coupled to the shell and sealingly engaged with the filter media, the end plate engaged with and coupled to the filter head, the end plate comprising: a nut plate engaged with the shell; and an end cap portion engaged with the filter media and overmolded onto the nut plate; wherein the end plate is integrally formed as a single unitary body.

17. The filtration system of claim 16, wherein the end plate comprises:
   an inner body portion defining an inner fluid passageway;
   an outer body portion coupled to the inner body portion and spaced radially apart from the inner body portion to define an outer fluid passageway, the inner fluid passageway fluidly separated from the outer fluid passageway by the inner body portion, the end cap portion coupled to one of the inner body portion or the outer body portion, the end cap portion sealingly engaged with the filter media.

\* \* \* \* \*